(12) United States Patent
Nadeem et al.

(10) Patent No.: US 12,321,386 B1
(45) Date of Patent: Jun. 3, 2025

(54) GENERATING XML CONFIGURATION SUB-STREAMS BASED ON AN XML CONFIGURATION STREAM AND A METADATA TREE ASSOCIATED WITH THE XML CONFIGURATION STREAM

(71) Applicant: Juniper Networks, Inc., Sunnyvale, CA (US)

(72) Inventors: Fnu Nadeem, Fremont, CA (US); Pradeep H. Krishnamurthy, Bangalore (IN); Raviraj Satish Deshmukh, Pune (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/128,643

(22) Filed: Mar. 30, 2023

(51) Int. Cl.
G06F 16/81 (2019.01)
G06F 16/84 (2019.01)

(52) U.S. Cl.
CPC .............. *G06F 16/84* (2019.01); *G06F 16/81* (2019.01)

(58) Field of Classification Search
CPC ................................. G06F 16/84; G06F 16/81
USPC ........................................................ 707/714
See application file for complete search history.

(56) References Cited

U.S. PATENT DOCUMENTS

| | | | | |
|---|---|---|---|---|
| 6,513,112 B1* | 1/2003 | Craig | ...................... | G06F 8/71 713/1 |
| 6,938,079 B1* | 8/2005 | Anderson | ........... | G06F 9/44505 709/224 |
| 7,054,924 B1* | 5/2006 | Harvey | ................. | H04L 67/125 709/219 |
| 7,194,386 B1* | 3/2007 | Parikh | ................. | G06F 11/3495 709/224 |
| 7,289,997 B1* | 10/2007 | Kita | ....................... | G06F 16/289 |
| 7,644,403 B2* | 1/2010 | Atsatt | ................. | G06F 9/44521 717/166 |
| 7,668,884 B2* | 2/2010 | Prahlad | ................... | G06F 16/16 707/672 |
| 7,747,579 B2* | 6/2010 | Prahlad | ................. | G06F 16/122 707/672 |

(Continued)

OTHER PUBLICATIONS

"The easiest way to write mission-critical real-time applications and microservices", 2023, 5 pages, Kafka, Apache Software Foundation, https://kafka.apache.org/documentation/streams/.

(Continued)

*Primary Examiner* — Hanh B Thai
(74) *Attorney, Agent, or Firm* — Harrity & Harrity, LLP

(57) ABSTRACT

In some implementations, a system may receive an extensible markup language (XML) configuration stream that indicates one or more resource configurations. The system may maintain a data model that includes metadata that describes the XML configuration stream. The system may process the data model to generate a metadata tree. The system may generate, based on the XML configuration stream and the metadata tree, one or more XML configuration sub-streams that are respectively associated with a subset of the one or more resource configurations. The system may process, using respective resource processing modules of the system, the one or more XML configuration sub-streams to generate respective information associated with the subset of the one or more resource configurations.

20 Claims, 15 Drawing Sheets

(56) References Cited

U.S. PATENT DOCUMENTS

| | | | | |
|---|---|---|---|---|
| 7,784,036 | B2* | 8/2010 | Tjong | G06F 40/205 |
| | | | | 717/136 |
| 8,074,218 | B2* | 12/2011 | Eilam | G06F 8/10 |
| | | | | 717/124 |
| 8,417,715 | B1* | 4/2013 | Bruckhaus | G06Q 10/04 |
| | | | | 705/26.1 |
| 8,615,531 | B2* | 12/2013 | Arthursson | H04L 67/1095 |
| | | | | 707/602 |
| 9,021,010 | B1* | 4/2015 | Das | H04L 67/1097 |
| | | | | 709/239 |
| 10,539,953 | B1* | 1/2020 | Longfellow | G05B 19/4183 |
| 10,936,336 | B1* | 3/2021 | Willett | G06F 9/44505 |
| 11,520,606 | B2* | 12/2022 | Nandagopal | G06F 8/38 |
| 11,694,303 | B2* | 7/2023 | Lee | G06T 3/4038 |
| | | | | 382/100 |
| 11,762,656 | B2* | 9/2023 | Rudraraju | G06F 8/60 |
| | | | | 719/328 |
| 12,003,365 | B1* | 6/2024 | Willett | H04L 9/3247 |
| 2004/0128169 | A1* | 7/2004 | Lusen | G06Q 10/10 |
| | | | | 707/999.009 |
| 2005/0071818 | A1* | 3/2005 | Reissman | G06F 11/3672 |
| | | | | 717/127 |
| 2005/0193397 | A1* | 9/2005 | Corenthin | G11B 20/1833 |
| | | | | 348/E5.051 |
| 2005/0234931 | A1* | 10/2005 | Yip | H04L 41/5054 |
| 2005/0273490 | A1* | 12/2005 | Shrivastava | G06F 11/0715 |
| | | | | 714/E11.026 |
| 2005/0273703 | A1* | 12/2005 | Doughan | G06F 16/84 |
| | | | | 717/136 |
| 2005/0273768 | A1* | 12/2005 | Doughan | G06F 8/30 |
| | | | | 717/136 |
| 2005/0278358 | A1* | 12/2005 | Doughan | G06F 16/258 |
| 2006/0020951 | A1 | 1/2006 | Fry et al. | |
| 2006/0161635 | A1* | 7/2006 | Lamkin | G06F 16/16 |
| | | | | 709/217 |
| 2006/0195420 | A1* | 8/2006 | Kilroy | G06F 16/243 |
| 2007/0124373 | A1* | 5/2007 | Chatterjee | G06Q 10/10 |
| | | | | 709/204 |
| 2008/0033985 | A1* | 2/2008 | Aronow | G06F 16/24522 |
| | | | | 707/999.102 |
| 2008/0147823 | A1* | 6/2008 | Azami | H04N 21/435 |
| | | | | 709/217 |
| 2009/0043736 | A1 | 2/2009 | Han et al. | |
| 2009/0070786 | A1* | 3/2009 | Alves | G06Q 40/02 |
| | | | | 719/318 |
| 2009/0319647 | A1* | 12/2009 | White | H04L 41/145 |
| | | | | 709/221 |
| 2010/0138825 | A1* | 6/2010 | Harrop | G06F 9/44505 |
| | | | | 717/174 |
| 2010/0262577 | A1* | 10/2010 | Pulfer | G06F 21/6209 |
| | | | | 707/E17.008 |
| 2012/0023488 | A1* | 1/2012 | Morris | G06F 8/4435 |
| | | | | 717/137 |
| 2012/0114302 | A1* | 5/2012 | Randall | H04N 9/87 |
| | | | | 386/E9.011 |
| 2012/0185821 | A1* | 7/2012 | Yaseen | G06F 8/35 |
| | | | | 717/104 |
| 2013/0136253 | A1* | 5/2013 | Liberman Ben-Ami | |
| | | | | H04M 3/5191 |
| | | | | 379/265.09 |
| 2014/0136958 | A1* | 5/2014 | Scattergood | G06F 40/143 |
| | | | | 715/236 |
| 2015/0052148 | A1* | 2/2015 | Indeck | G06F 16/2228 |
| | | | | 707/741 |
| 2015/0127783 | A1* | 5/2015 | Lissack | H04L 41/0894 |
| | | | | 709/220 |
| 2015/0149611 | A1* | 5/2015 | Lissack | H04L 41/22 |
| | | | | 709/224 |
| 2015/0227504 | A1* | 8/2015 | Zhang | G06F 40/205 |
| | | | | 715/244 |
| 2015/0269194 | A1* | 9/2015 | King | G06F 9/44505 |
| | | | | 707/805 |
| 2015/0269248 | A1* | 9/2015 | King | G06F 16/289 |
| | | | | 707/811 |
| 2015/0355890 | A1* | 12/2015 | Tyler | G06F 8/41 |
| | | | | 717/140 |
| 2017/0177263 | A1* | 6/2017 | Das | G06F 13/382 |
| 2018/0260468 | A1* | 9/2018 | Ben-Natan | G06F 16/81 |
| 2019/0057222 | A1* | 2/2019 | Bradley | G06F 21/602 |
| 2019/0281588 | A1* | 9/2019 | Zhang | H04B 7/0617 |
| 2020/0034216 | A1* | 1/2020 | Kolodzieski | G06F 8/60 |
| 2020/0076685 | A1* | 3/2020 | Vaidya | G06F 9/44526 |
| 2021/0105338 | A1* | 4/2021 | Oyman | H04L 67/61 |
| 2021/0224093 | A1* | 7/2021 | Fu | G06F 9/5072 |
| 2021/0240672 | A1* | 8/2021 | Dillon | G06F 16/148 |
| 2021/0374151 | A1* | 12/2021 | Huss | G06F 9/465 |
| 2023/0025526 | A1* | 1/2023 | Grzybek | G06F 8/71 |
| 2023/0091521 | A1* | 3/2023 | Deshmukh | H04L 45/24 |
| | | | | 709/220 |
| 2023/0108560 | A1* | 4/2023 | Wang | G06F 3/04817 |
| | | | | 717/109 |
| 2023/0266973 | A1* | 8/2023 | Wu | G06F 9/50 |
| | | | | 718/104 |
| 2024/0031284 | A1* | 1/2024 | Hsia | H04L 45/586 |

OTHER PUBLICATIONS

Michal Dabrowski, "How to Split a Stream into Multiple Streams", 7 pages, Aug. 5, 2022, https://www.baeldung.com/java-split-stream.

"Filtering XPath", Version 11.1, Bizagi, https://help.bizagi.com/bpm-suite/en/11.1/index.htm?filtering_xpath.htm.

"XSL Transformations (XSLT) Version 3.0", Jun. 8, 2017, 930 pages, W3C; https://www.w3.org/TR/xslt-30.

* cited by examiner

200

```
--------------------------------------------------------------
XML Main Cfg Stream:
--------------------------------------------------------------
<configuration>
    <system>
        .
        .
        .
    </system>
    <interfaces>
        .
        .
        .
    </interfaces>
    <protocol>
        .
        .
        .
    </protocol>
    <security>
        <zones>
            <security-zone>
                .
                .
                .
            <security-zone>
        </zones>
    </security>
    <routing-policy>
        .
        .
        .
    </routing-policy>
</configuration>
```

FIG. 2A

```
module XYZ-config {
    namespace "http://yang.xyz.net/XYZ/conf/XYZ-config";

prefix "jcr";

organization
      "XYZ, Inc.";

description
      "a YANG describing all top level elements for configuration hierarchies";

revision 2021-04-04 {
        description
          "XYZ: 20.4R1.12";
    } extension config-filter {
        description
          "when present on a container, list or a leaf
           indicates that everything below that node
           should be included in the filtered output";
    } extension config-resource {
        description
          "when present on a container, list or a leaf
           indicates the openconfig resource that this container or list
           represents."
    } container configuration {
        config true;
        uses xyz-config;
    } grouping xyz-config {
        uses system-group;
        uses interfaces-group;
        uses security-group;
    } grouping system-group {
        container system {
            jcr:config-filter;
            jcr:config-resource "System";
        }
    }
```

FIG. 2B

```
grouping interfaces-group {
    container interfaces {
        jcr:config-filter;
        jcr:config-resource "Interface,Subinterface";
        list interface {
            key name;
            leaf name {
                type string;
            }
            list unit {
                key name;
                leaf name {
                    type string;
                }
                container family {
                    container inet {
                    }
                    container inet6 {
                    }
                    container mpls {
                    }
                    container ethernet-switching {
                    }
                }
            }
            container aggregated-ether-options {
            }
            container ether-options {
            }
            container gigether-options {
            }
        }
    }
}
```

FIG. 2C

```
grouping security-group {
    container security {
        container zones {
            jcr:config-resource "Zone";
            list security-zone {
                key name;
                leaf name {
                    type string;
                    jcr:config-filter;
                }
                leaf description {
                    type string;
                    jcr:config-filter;
                }
                leaf tcp-rst {
                    type empty;
                    jcr:config-filter;
                }
                leaf application-tracking {
                    type empty;
                    jcr:config-filter;
                }
                leaf source-identity-log {
                    type empty;
                    jcr:config-filter;
                }
                leaf enable-reverse-reroute {
                    type empty;
                    jcr:config-filter;
                }
                container host-inbound-traffic {
                    jcr:config-filter;
                }
                list interfaces {
                    key name;
                    leaf name {
                        type string;
                    }
                    jcr:config-filter;
                }
            }
        }
        container log {
            jcr:config-filter;
        }
    }
}
```

FIG. 2D

```
XML Cfg Sub-Stream for System Processor:

<configuration>
    <system>
        .
        .
    </system>
</configuration>
```

FIG. 2E

```
XML Cfg Sub-Stream for Interface Processor:

<configuration>
    <interfaces>
        .
        .
        .
    </interfaces>
</configuration>
```

FIG. 2F

```
XML Cfg Sub-Stream for Security-Zone Processor:

<configuration>
    <security>
        <zones>
            <security-zone>
                .
                .
            <security-zone>
        </zones>
    </security>
</configuration>
```

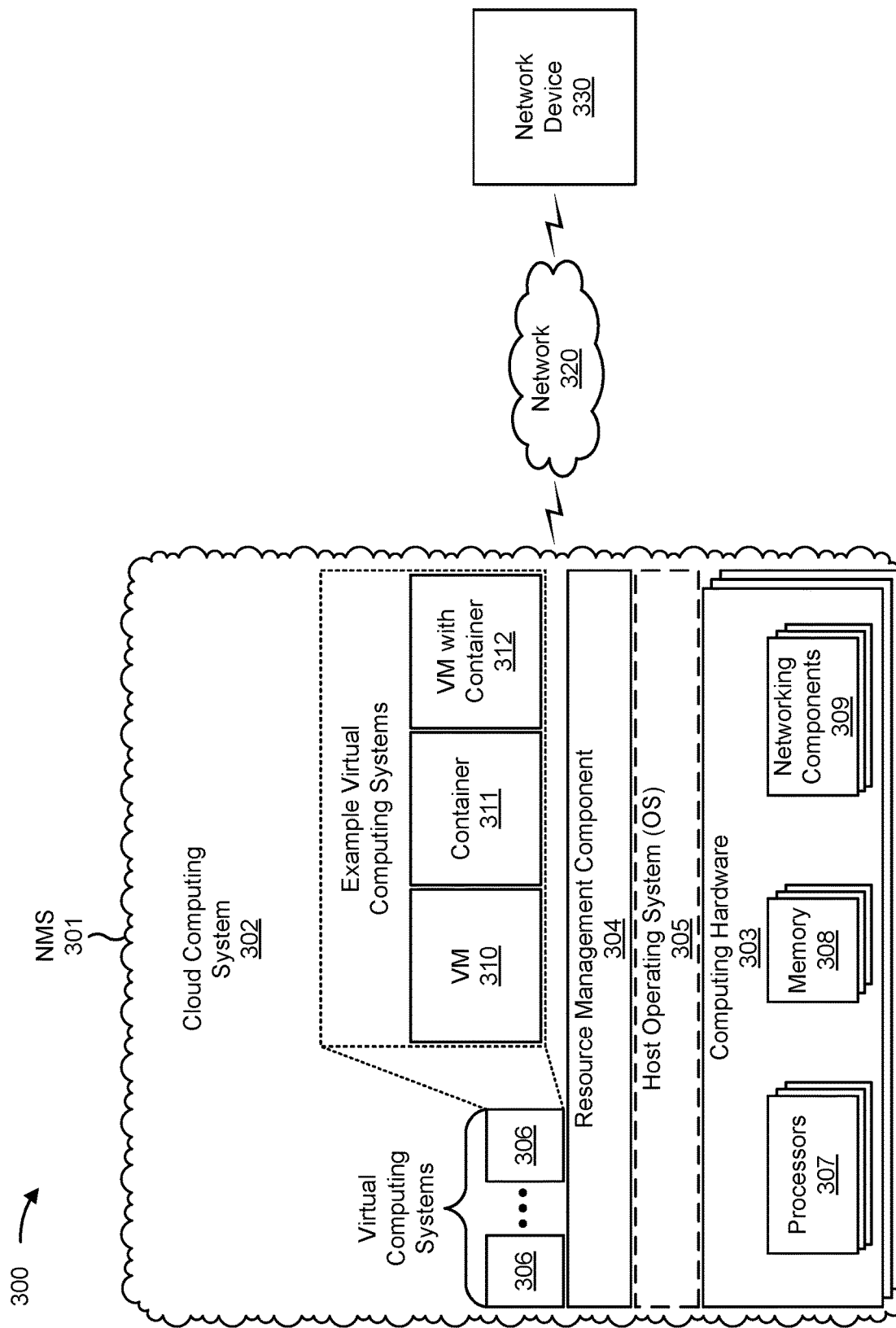

GENERATING XML CONFIGURATION SUB-STREAMS BASED ON AN XML CONFIGURATION STREAM AND A METADATA TREE ASSOCIATED WITH THE XML CONFIGURATION STREAM

BACKGROUND

A network device (e.g., a router, a switch, or another network device) can support one or more resources (also referred to as services), such as a security resource, an interface resource, and/or a routing-policy resource. The one or more resources may be configured according to a configuration file (e.g., that indicates one or more resource configurations) included in the network device, which may be formatted according to an extensible markup language (XML).

SUMMARY

In some implementations, a method includes receiving, by a system, an XML configuration stream that indicates one or more resource configurations; maintaining, by the system, in the form of a data model, metadata that describes the XML configuration stream; processing, by the system, the data model to generate a metadata tree; generating, by the system and based on the XML configuration stream and the metadata tree, one or more XML configuration sub-streams that are respectively associated with a subset of the one or more resource configurations; and processing, by the system and using respective resource processing modules of the system, the one or more XML configuration sub-streams to generate respective information associated with the subset of the one or more resource configurations.

In some implementations, a non-transitory computer-readable medium storing a set of instructions includes one or more instructions that, when executed by one or more processors of a system, cause the system to: receive an XML configuration stream; maintain a data model associated with the XML configuration stream; process the data model to generate a metadata tree; and generate, based on the XML configuration stream and the metadata tree, one or more XML configuration sub-streams.

In some implementations, a system includes one or more memories; and one or more processors to: process an XML configuration stream that indicates one or more resource configurations to generate a metadata tree; generate, based on the XML configuration stream and the metadata tree, one or more XML configuration sub-streams that are respectively associated with a subset of the one or more resource configurations; and process, using respective resource processing modules of the system, the one or more XML configuration sub-streams to generate respective information associated with the subset of the one or more resource configurations.

BRIEF DESCRIPTION OF THE DRAWINGS

FIGS. 2A-2G are diagrams of an example implementation related to an XML configuration stream and XML configuration sub-streams that are associated with the XML configuration stream.

FIG. 3 is a diagram of an example environment in which systems and/or methods described herein may be implemented.

DETAILED DESCRIPTION

Figure 1A:
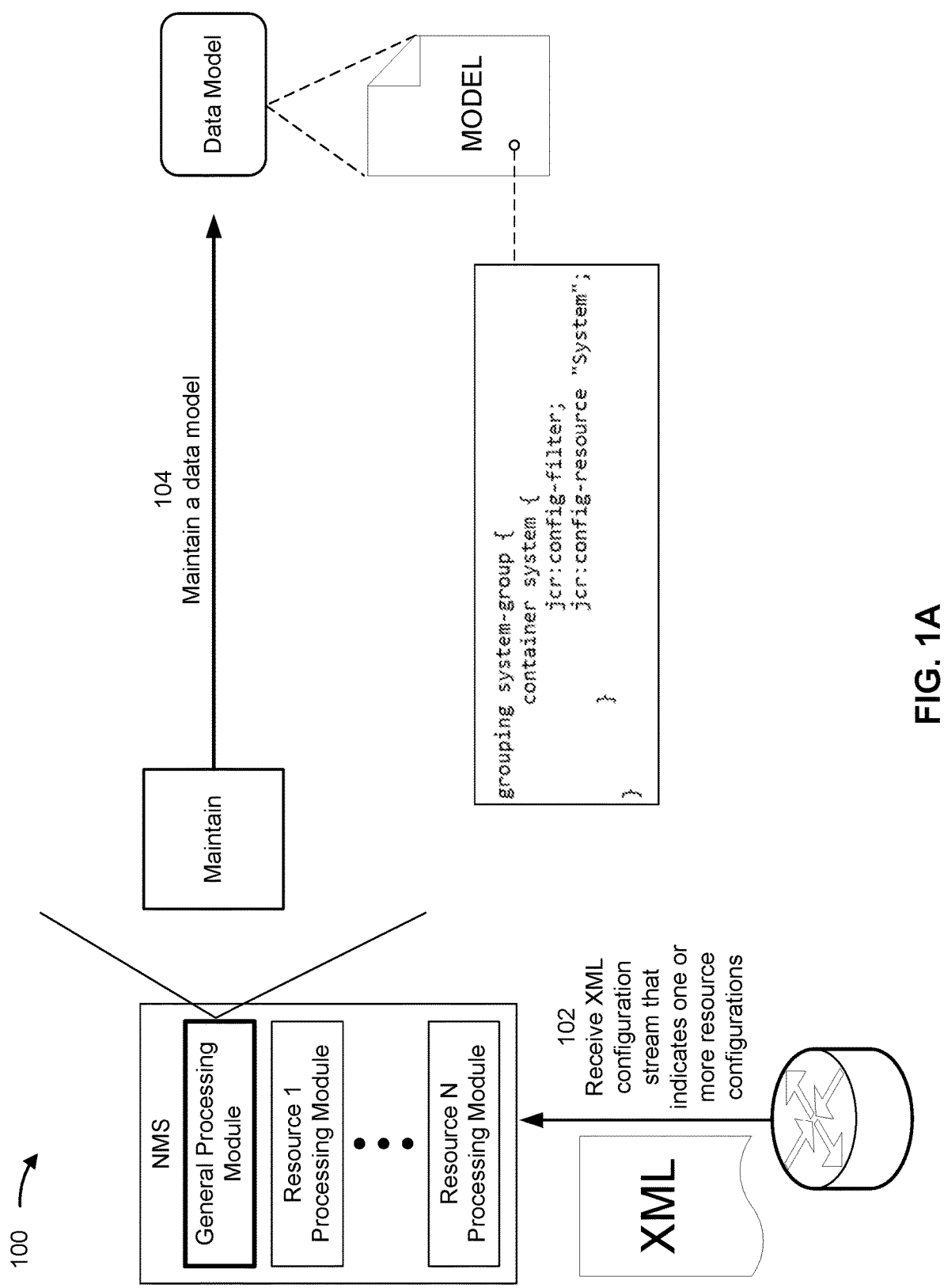
FIGS. 1A-1D are diagrams of one or more example implementations described herein.

The following detailed description of example implementations refers to the accompanying drawings. The same reference numbers in different drawings may identify the same or similar elements.

A network management system can manage multiple, different network devices in a network. In some cases, a configuration of a network device may be updated (e.g., by the network management system, or by another device, such as a client device of a network administrator). Accordingly, the network device (or another device, such as the client device) may provide an XML configuration stream to the network management system. The XML configuration stream may be a stream of the configuration file that has been updated to cause the network device to be updated. The network management system may analyze the XML configuration stream to determine how the configuration of the network device has been updated and/or what updates should be made to other network devices in the network (e.g., to ensure consistency and/or compatibility among the network devices), among other examples.

Typically, to analyze the XML configuration stream, the network management system waits until the entire XML configuration stream is received and then analyzes the XML configuration stream. The network management system then uses different filters to identify sections of the XML configuration streams that are associated with particular resource configurations, which is a serial process. Further, when the network management system needs to translate some or all of the XML configuration stream into another version (e.g., a vendor neutral representation, such as an OpenConfig representation) to enable updating of other, different network devices, the network management system can use a transformation technique (e.g., an extensible stylesheet language transformation (XSLT) technique) that requires generation of a document object model (DOM) of the XML configuration stream. XSLT 3.0 tries to improve over XSLT 2.0 with respect to reducing the size of source document and result document maintained in memory, but still while evaluating the XPATH expressions the intermediate results are stored in variables in evaluation-context. Moreover, these transformations cannot be distributed across multiple machines to reduce the memory and compute resources used from one single machine. These approaches are computing intensive (e.g., consume large amounts of computing resources, such as processing resources, memory resources, communication resources, and/or power resources, among other examples) and/or time intensive (e.g., require idle time and/or require lengthy calculations to be performed that consume multiple computing cycles). If such transformations are carried out on the Kubernetes based deployments, then there is always a possibility of single POD executing these transformations exceeding its allocated CPU and memory resources, causing Kubernetes orchestrator to restart the POD.

Some implementations described herein provide a network management system (NMS). The NMS receives an XML configuration stream that indicates one or more resource configurations. The NMS maintains a data model (e.g., a "minimal" data model) describing the XML configuration stream, and then processes the data model to generate a metadata tree. The NMS may include in the data model one or more data elements that correspond to the one or more resource configurations, and may cause particular data elements to include additional parameters to identify the particular data elements and/or to indicate that the particular data elements are of interest (e.g., that the particular data elements correspond to resource configurations that are relevant to configuring other network devices). The metadata tree may therefore include only nodes that are associated with resource configurations of interest (e.g., based on the parameters of the particular data elements). The NMS (e.g., using a general processing module) then processes the XML configuration stream and the metadata tree (e.g., simultaneously, in a combined process) to generate one or more XML configuration sub-streams. For example, the NMS may identify subtrees of the metadata tree that are associated with a particular resource configuration and may thereby cause elements (and attributes) of the XML configuration stream to be included in an XML configuration sub-stream associated with the particular resource configuration.

In this way, the NMS is able to process the XML configuration stream and dynamically generate the one or more XML configuration sub-streams (e.g., without waiting for the XML configuration stream to be fully received and stored in transient or intermediary storage). Further, by using a metadata tree (e.g., that is generated based on a minimal data model), the NMS is able to "filter" the XML configuration stream without modifying the XML configuration stream or needing to maintain a separate copy of the XML configuration stream. The NMS, therefore, to generate the one or more XML configuration sub-streams, uses fewer computing resources (e.g., processing resources, memory resources, communication resources, and/or power resources, among other examples) and can do so in less time than a network management system that uses a typical approach. Additionally, because a minimal data model is maintained, the NMS does not need to account for specific or unique attributes of the XML configuration stream (including all the attributes that can cause the data model to exponentially grow in size), which further conserves resources. Further, because the minimal data model is associated with high-level features of the XML configuration stream, the minimal data model may be provided to the NMS (e.g., by another device, such as via a Kubernetes custom resource definition (CRD) functionality) rather than maintained by the NMS, which improves the operational efficiency of the system where the CRD can be updated to include the new resources to generate additional sub-streams without requiring redeployment or restart of NMS.

Moreover, the NMS may include one or more resource processing modules that are configured to process the one or more XML configuration sub-streams. Each resource processing module may be associated with a resource and may be configured to process an XML configuration sub-stream that is associated with the resource. Accordingly, the resource processing module may be optimized to process the XML configuration sub-stream, and may use computing resources that are allocated to the resource processing module (rather than computing resources allocated to the general/main processing module of the NMS). This conserves computing resources allocated to the general/main processing module. Further, the one or more resource processing modules may operate in parallel, which allows for a more efficient use of computing resources allocated to processing modules of the NMS, and also improves a computing time performance of the NMS (e.g., to generate information associated with the one or more XML configuration sub-streams). Once the sub-stream is read by a resource processing module it may proceed independent of the other resource processing modules to operate on that sub-stream.

FIGS. 1A-1D are diagrams of one or more example implementations 100 described herein. As shown in FIGS. 1A-1D, example implementation(s) 100 may include an NMS and a network device. The NMS and the network device are described in more detail below in connection with FIGS. 2-4. As shown in FIGS. 1A-1D, the NMS may include a general processing module, and one or more resource processing modules (shown as resource processing modules 1 through N, where N>1). The general processing module may be configured to perform general processing tasks of the NMS, and each resource processing module may be configured to perform processing tasks for an associated resource. For example, a resource 1 processing module may be configured to perform processing tasks associated with a resource 1, a resource 2 processing module may be configured to perform processing tasks associated with a resource 2, and so on.

As shown in FIG. 1A, and by reference number 102, the NMS may receive an XML configuration stream. For example, a network device may provide the XML configuration stream to the NMS, and the NMS may thereby receive the XML configuration stream from the network device. In some implementations, the NMS may receive the XML configuration stream from another device (e.g., another network device, a client device, a server device, or another type of device) or a data structure (e.g., a database, a table, a file, or another type of data structure). The XML configuration stream may include a plurality of elements, such as sets of elements that each include a start element and corresponding end element (e.g., as shown in FIGS. 2A-2D), wherein a set of elements may be associated with one or more attributes. That is, the XML configuration stream may be structured in an XML format. Accordingly, the XML configuration stream may indicate one or more resource configurations, such as for the network device (e.g., that provided the XML configuration stream to the NMS). For example, the XML configuration may indicate (e.g., by a first set of elements and one or more attributes of the first set of elements) one or more configurations for a first resource, may indicate (e.g., by a second set of elements and one or more attributes of the second set of elements) one or more configurations for a second resource, and so on.

As shown by reference number 104, the NMS may maintain a data model. The data model may include metadata that describes the XML configuration stream (e.g., the data model may include metadata that provides information about a structure of the XML configuration stream). For example, for each resource configuration indicated by the XML configuration, the data model may include a data element that corresponds to the resource configuration. The data model may be, for example, a "yet another next generation" (YANG) data model. In some implementations, the data model may represent at least some information associated with the one or more resource configurations indicated by the XML configuration stream. For example, the data model may include one or more data elements that identify the one or more resource configurations. In some implementations, the one or more data elements may not represent specific configuration details associated with the one or more resource configurations. Accordingly, the data model may be considered to be a "minimal" data model (e.g., a minimal YANG data model).

In some implementations, the NMS (e.g., using the general processing module) may maintain the data model such that the data model includes additional information (e.g., that is not included in the XML configuration stream). For example, the data model may include a data element that corresponds to a resource configuration (e.g., that is indicated by the XML configuration stream), wherein the data element includes one or more parameters. For example, a first parameter may indicate that the data element (for example, and/or the corresponding resource configuration) is of interest, such as for further processing by the NMS; and/or a second parameter may indicate an identifier (e.g., an alphanumeric string, or other identifier) that is associated with the data element (and/or the corresponding resource configuration). As a specific example, as further shown in FIG. 1A, the data model may include a "system" data element associated with a "system" resource configuration (shown as "container system") that includes a first parameter (shown as "jcr:config-filter") that indicates that the system data element (and/or the system resource configuration) is of interest, and a second parameter (shown as "jcr:config-resource 'System'") that is an identifier that is associated with the system data element (and/or the system resource configuration).

In some implementations, the data model may be represented as a Kubernetes CRD. With this approach, it is possible to generate new sub-streams (as described herein) by updating the CRD to include a data element that includes one or more parameters. Accordingly, the system may include other processing modules to process the new sub-streams. Further, the system may maintain a mapping between sub-streams and corresponding processing modules. This approach is extensible and new sub-streams can be included without requiring restart of any of the existing processing modules.

Figure 1B:
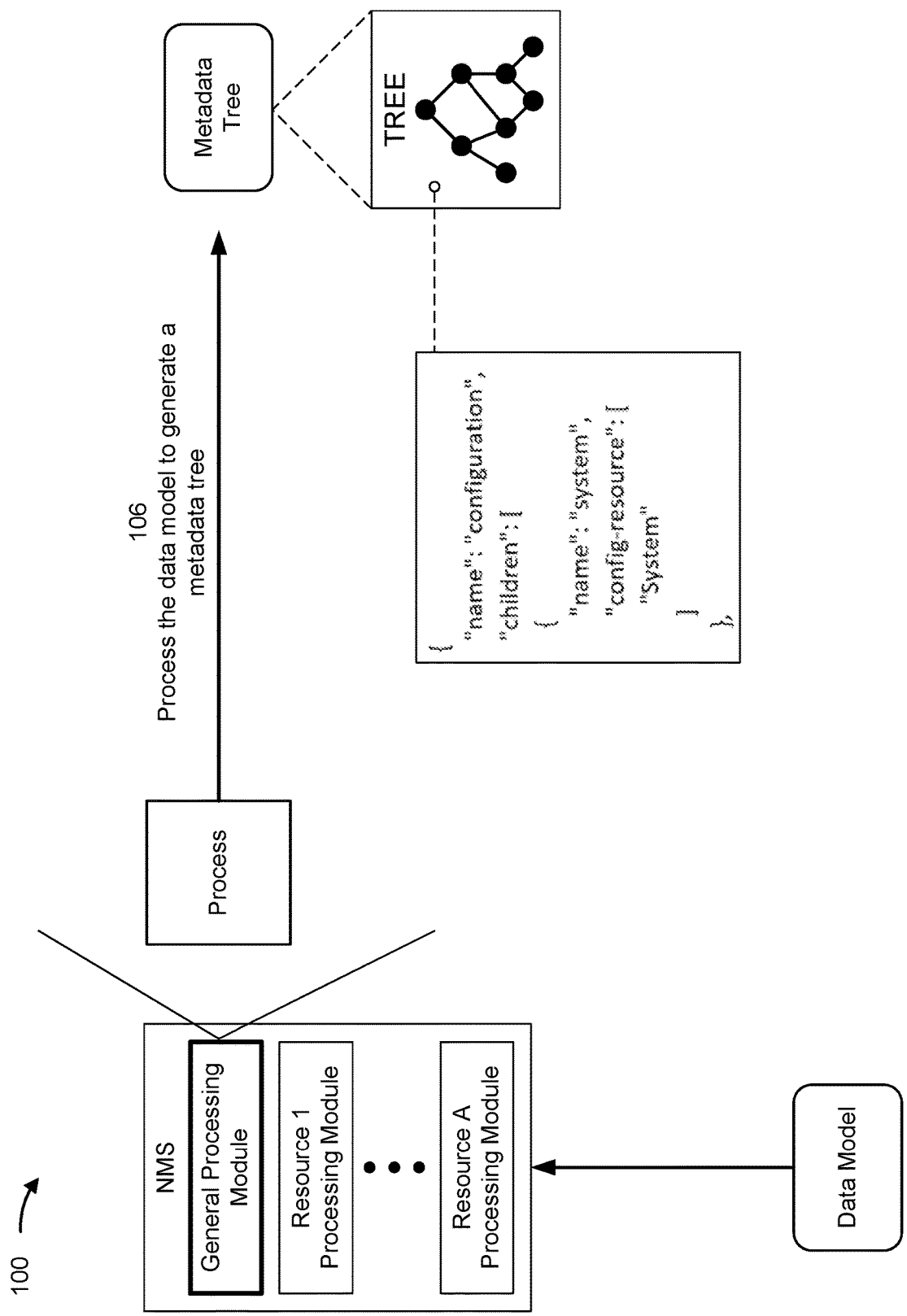

As shown in FIG. 1B, and by reference number 106, the NMS may process the data model to generate a metadata tree. The metadata tree may include, for example, one or more nodes that correspond to one or more data elements of the data model. Accordingly, a node of the metadata tree may correspond to a data element of the data model, and therefore may correspond to a resource configuration of the XML configuration stream (e.g., because the data element corresponds to the resource configuration). Each node may identify the data element that the node corresponds to, and may include, for example, one or more parameters of the data element (e.g., a first parameter and/or a second parameter included in the data element, as described above). As a specific example, as further shown in FIG. 1B, the metadata may include a "system" node (e.g., that corresponds to the system data element of the data model, and therefore corresponds with the system resource configuration) that includes a second parameter (shown as "config-resource 'System'") that is an identifier that is associated with the system data element (and/or the system resource configuration).

In some implementations, the metadata tree may include only nodes that correspond to data elements of the data model that each include a first parameter (e.g., that indicates that the data element, and/or the corresponding resource configuration, is of interest, such as for further processing by the NMS). For example, the metadata tree may include only nodes that correspond to data elements with a "jcr: config-filter" parameter. In some implementations, the metadata tree may include nodes that correspond to data elements that have a first parameter, and that descend from (e.g., are children of) data elements that have the first parameter. In this way, the metadata tree may be considered to be "filtered" to include nodes that are associated with resource configurations that are of interest, and, optionally, resource configurations associated with the resource configurations that are of interest.

Figure 1C:
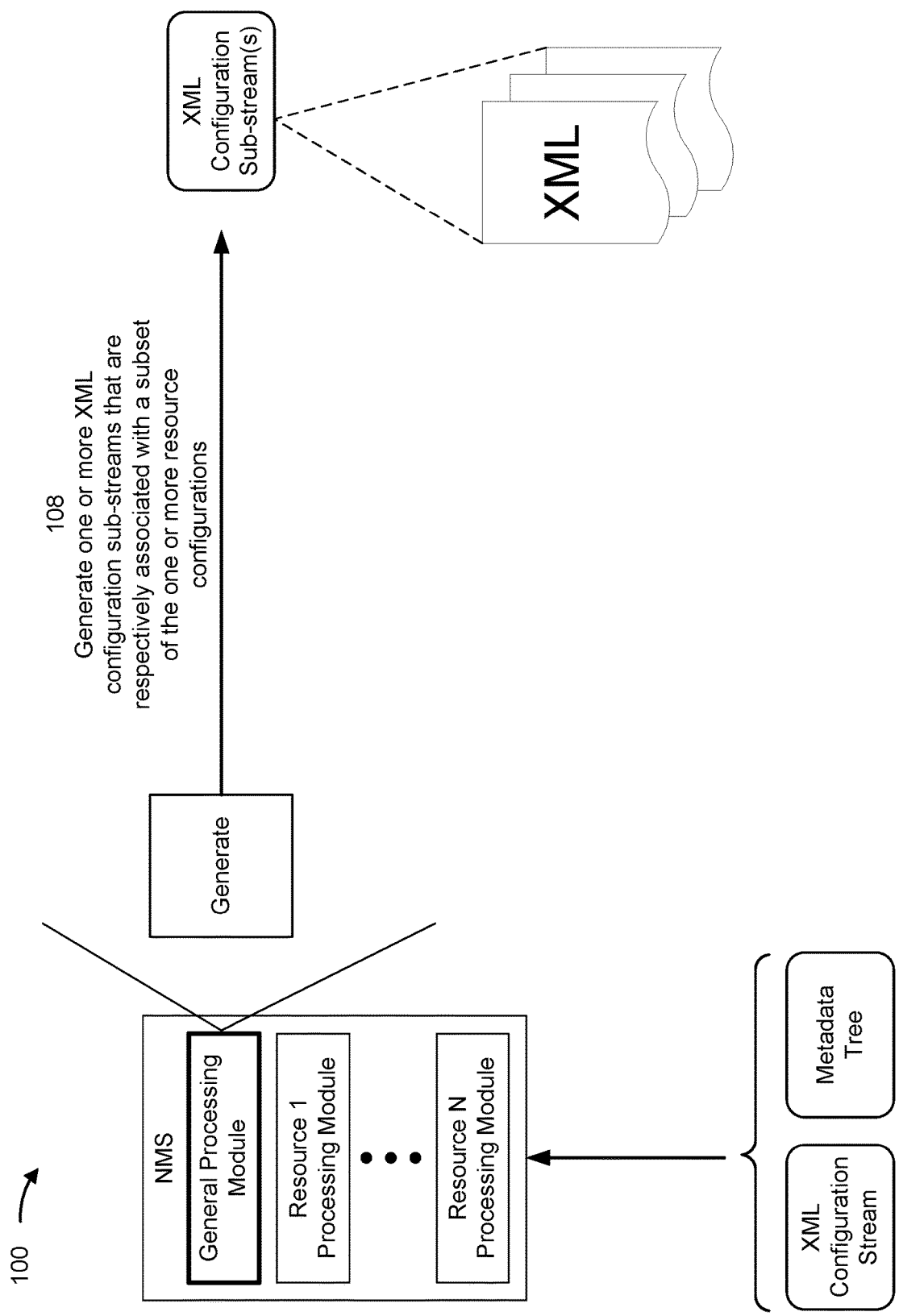

As shown in FIG. 1C, and by reference number 108, the NMS may generate one or more XML configuration sub-streams (e.g., based on the XML configuration stream and the metadata tree). For example, the NMS may process (e.g., parse, decode, and/or perform one or more other processing techniques) the XML configuration stream and may process (e.g., traverse and/or perform one or more other processing techniques) the metadata tree (e.g., simultaneously, as part of a combined process) to generate the one or more XML configuration sub-streams. The one or more XML configuration sub-streams may be respectively associated with a subset (e.g., that includes at least one resource configuration) of the one or more resource configurations (e.g., that are indicated by the XML configuration stream). For example, the NMS may generate an XML configuration sub-stream for the resource 1 and the resource N (but not for the resource 2).

In some implementations, when the NMS is processing the XML configuration stream and the metadata tree, the NMS may identify a start element (e.g., that is associated with a resource configuration) of the XML configuration stream. The NMS then may determine whether a node of the metadata tree is associated with the start element (e.g., whether the node corresponds to the resource configuration). When the NMS does not identify a node that is associated with the start element, the NMS may ignore the start element, and one or more other elements that are associated with the start element (e.g., an end element that corresponds to the start element, and/or one or more other elements that are child elements of the start element). Alternatively, when the NMS identifies a node that is associated with the start element, the NMS may cause a stream writer to be created (e.g., as a processing instance within the general processing module of the NMS). The stream writer may be configured to generate an XML configuration sub-stream (e.g., based on information provided to the stream writer by the NMS, as described herein).

In some implementations, the NMS (e.g., after causing the stream writer to be created) may generate an XML snippet (e.g., based on processing the XML configuration stream and the metadata tree). The NMS may provide the XML snippet to the stream writer, which may allow the stream writer to generate a particular XML configuration sub-stream. The particular XML configuration sub-stream may include a portion of the XML configuration stream, such that the particular XML configuration sub-stream indicates one or more configuration settings of the resource configuration (e.g., that is associated with the start element).

In some implementations, to generate the XML snippet, the NMS may identify another start element of the XML configuration stream (e.g., that is a child element of the start element described above). The NMS then may identify another node of the metadata tree that is associated with the other start element. Accordingly, the NMS may determine (e.g., based on the other node) whether the other start element is to be included in the XML snippet.

For example, the NMS may determine that the other node is associated with a data element of the data model, and that the other node includes a second parameter (e.g., that indicates an identifier that is associated with the data element). The other start element may be a parent element in a set of elements (e.g., that includes the other start element and a corresponding end element, and one or more child elements of the other start element) of the XML configuration stream. The NMS may therefore determine (e.g., based on determining that the other node includes a second parameter) that the set of elements are to be included in the XML snippet, and may thereby generate the XML snippet to include the set of elements (and, optionally, respective attributes of the set of elements). In this way, the XML snippet may be generated to include elements (and attributes) that are associated with the resource configuration.

As another example, the NMS may determine that the other node is associated with a data element of the data model, and that the other node does not include a second parameter. The NMS may therefore determine that the other start element is to not be included in the XML snippet, and may thereby generate the XML snippet to not include the other start element. Alternatively, the NMS may determine that the other start element is a child element of another element of the XML configuration stream (e.g., that is a child element of the start element) that is associated with a node that includes a second parameter. Accordingly, because the other element is to be included in the XML snippet (e.g., for one or more reasons described elsewhere herein), the NMS may determine that the other start element is to be included in the XML snippet, and may thereby generate the XML snippet to include the other start element (and, optionally, one or more attributes of the other start element). In this way, the XML snippet may be generated to include elements (and attributes) that are associated with other elements that are associated with the resource configuration.

In an additional example, the NMS may determine that the other node is associated with a data element of the data model, and that the other node is a leaf node of the metadata tree. The other start element may be a parent element of a set of elements (e.g., that includes child elements of the other start element) of the XML configuration stream. The NMS may therefore determine (e.g., based on determining that the other node is a leaf node of the metadata tree) that the set of elements are to be included in the XML snippet, and may thereby generate the XML snippet to include the set of elements. In this way, the XML snippet may be generated to include elements that are associated with the resource configuration, but that are not represented in the metadata tree, to maintain a hierarchical structure of start elements of the XML configuration stream in the XML snippet.

In some implementations, the NMS may determine that the other node of the metadata tree does not include a second parameter and that the other start element is not a child element of another element of the XML configuration stream that is to be included in the XML snippet. The NMS may therefore cause the other start element to be stored in a data structure (e.g., a stack, a queue, or another type of data structure) that stores start elements. In some implementations, the NMS may generate the XML snippet to include one or more elements (and, optionally, respective attributes of the one or more elements), such as for one or more reasons described elsewhere herein, and the NMS may therefore determine that one or more start elements of the data structure are to be included in the XML snippet. The NMS may generate the XML snippet to include (or to further include) the one or more start elements. In this way, a hierarchical structure of start elements of the XML configuration stream may be maintained in the XML snippet.

In some implementations, the NMS may identify an end element of the configuration stream that is associated with the start element (e.g., the end element corresponds to the start element). The NMS may therefore determine whether the data structure includes any start element (e.g., whether the data structure is full, or empty). For example, the NMS may identify that the data structure is storing one or more start elements (e.g., that are child elements of the start element), and may therefore generate one or more end elements that are respectively associated with the one or more start elements. The NMS then may generate the XML snippet to include the one or more end elements. In this way, the NMS facilitates a proper formatting (e.g., XML formatting) of the XML snippet.

After the NMS has generated the one or more XML configuration sub-streams, the NMS may flush (e.g., drop or remove) the XML configuration stream from the NMS. The NMS may also flush the data structure described herein (e.g., remove any start elements stored in the data structure). This frees up computing resources (e.g., processing resources, memory resources, communication resources, and/or power resources, among other examples) that would otherwise be used to maintain the XML configuration stream and/or the contents of the data structure in the NMS.

Figure 1D:
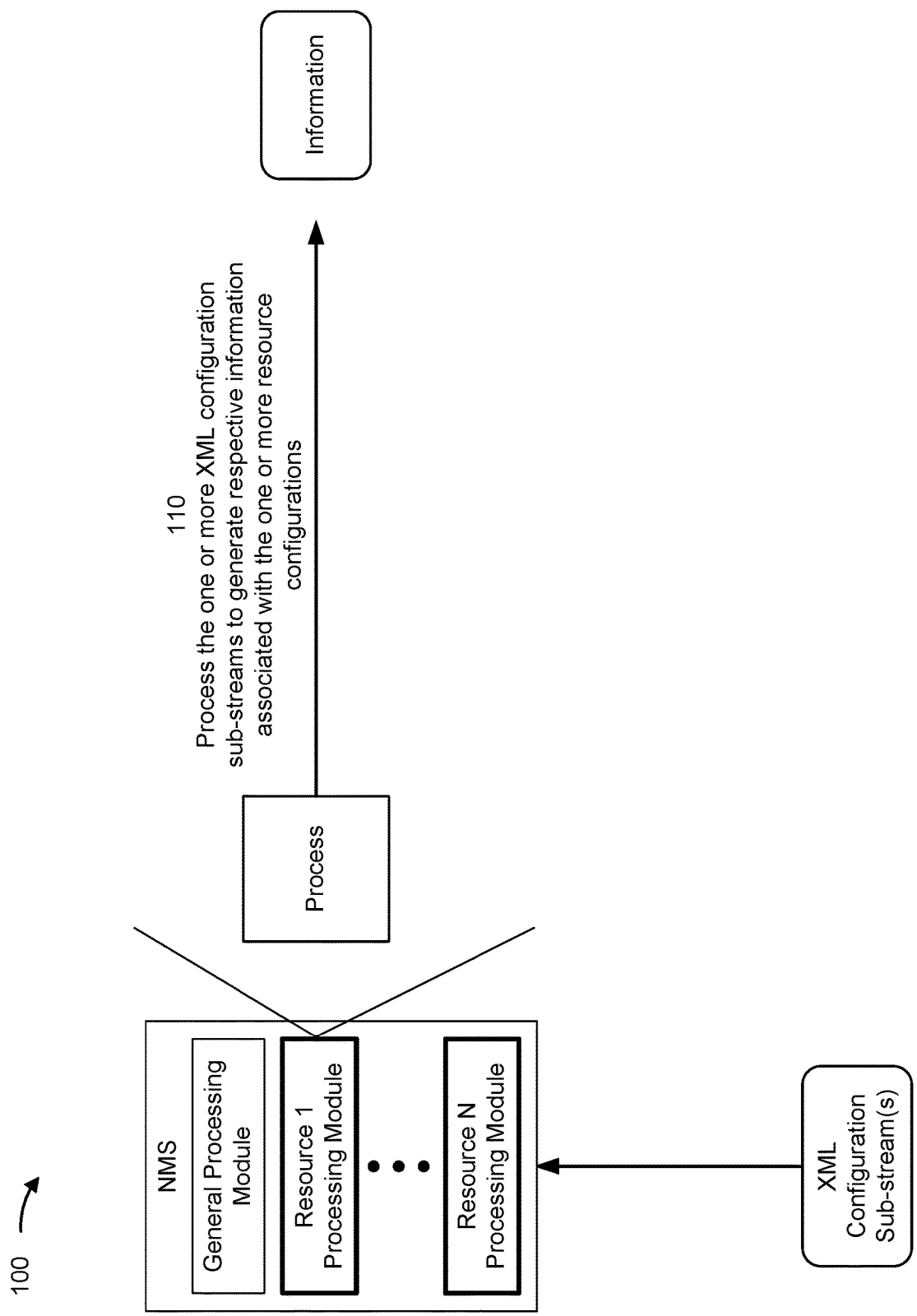

As shown in FIG. 1D, and by reference number 110, the NMS (e.g., using the one or more resource processing modules) may process the one or more XML configuration sub-streams to generate respective information associated with the subset of the one or more resource configurations. For example, the NMS may process, using the resource 1 processing module, an XML configuration sub-stream that is associated with a resource configuration for the resource 1 to generate information associated with the resource configuration for the resource 1; the NMS may process, using the resource 2 processing module, an XML configuration sub-stream that is associated with a resource configuration for the resource 2 to generate information associated with the resource configuration for the resource 2; and so on. In some implementations, the one or more resource processing modules may respectively process the one or more XML configuration sub-streams in parallel (e.g., at one or more overlapping times). Accordingly, by processing the one or more resource processing modules in this way, computing resources (e.g., processing resources, memory resources, communication resources, and/or power resources, among other examples) of the general processing module may be conserved, and the respective information associated with the one or more resource configurations may be generated more quickly than if the one or more XML configuration sub-streams were to be serially processed.

In some implementations, information associated with a resource configuration may include a translated version of an XML configuration sub-stream that is associated with the resource configuration. For example, the NMS may process (e.g., using the resource processing module associated with the resource configuration, and using a translation technique) the XML configuration sub-stream to generate the translated version of the XML configuration sub-stream. The translated version of the XML configuration sub-stream may be in a format (e.g., a vendor neutral format), such that the XML configuration sub-stream may be processed by a device (e.g., another network device) to allow the resource configuration for the device to be updated (e.g., according to the XML configuration sub-stream). Accordingly, the NMS may provide the translated version of the XML configuration sub-stream to the device, which may allow the device to update the resource configuration for the device.

In some implementations, information associated with a resource configuration may include update information associated with the resource configuration. The update information may indicate, for example, one or more out-of-band changes to the resource configuration, and/or one or more other modifications (e.g., one or more modified Xpaths) to the resource configuration. The NMS may process (e.g., using the resource processing module associated with the resource configuration, and using a comparison technique) the XML configuration sub-stream and another XML configuration sub-stream (e.g., a prior version of the XML configuration sub-stream) to determine the update information. The NMS may provide the update information to another device (e.g., another network device) to allow the resource configuration for the device to be updated (e.g., according to the update information).

In some implementations, using respective resource processing modules of the NMS to process the one or more XML configuration sub-streams allows for at least one of: the processing of the XML configuration across multiple processing modules, or the resource processing modules of the system and the general processing module of the system to not exceed respective resource allocations (e.g., compute and/or memory resource allocations).

As indicated above, FIGS. 1A-1D are provided as an example. Other examples may differ from what is described with regard to FIGS. 1A-1D.

FIGS. 2A-2G are diagrams of an example 200 related to an XML configuration stream, a data model that describes the XML configuration stream, and XML configuration sub-streams that are associated with the XML configuration stream. The NMS may process the XML configuration stream (e.g., based on the data model) to generate the XML configuration sub-streams, as described herein in relation to FIGS. 1A-1D.

As shown in FIG. 2A, the XML configuration stream may indicate configurations for a system resource (indicated by the start element <system> and the end element </system>), an interfaces resource (indicated by the start element <interfaces> and the end element </interfaces>), a protocol resource (indicated by the start element <protocol> and the end element </protocol>), a security resource (indicated by the start element <security> and the end element </security>), and a routing policy resource (indicated by the start element <routing-policy> and the end element </routing-policy>). As further shown in FIG. 2A, the XML configuration stream may indicate configurations for resources (e.g., sub-resources) that are associated with the security resource, such as configurations for a zones resource (indicated by the start element <security> and the end element </security>), and a security-zone resource (indicated by the start element <security-zone> and the end element </security-zone>), which is a sub-resource of the zones resource (and therefore a sub-sub-resource of the security resource).

As shown in FIGS. 2B-2D, the data model may include data elements that correspond to the resources indicated by the XML configuration stream (e.g., that are shown in FIG. 2A). For example, the data model may include a system data element (indicated by a system-group identifier, as shown in FIG. 2B) that corresponds to the system resource, an interfaces data element (e.g., indicated by a interfaces-group identifier, as shown in FIG. 2C) that corresponds to the interface resource, and a security data element (e.g., indicated by a security-group identifier, as shown in FIG. 2D) that corresponds to the security resource. As further shown in FIG. 2D, the data model may include data elements that correspond to sub-resources of the security resource, such as a zones data element (e.g., indicated by a zones identifier) and a security-zone data element (e.g., indicated by a security-zone identifier).

As shown in FIG. 2E, the NMS may process the XML configuration stream (e.g., using the data model) to generate a system resource XML configuration sub-stream (e.g., for processing by a system processing module of the NMS). As shown in FIG. 2F, the NMS may process the XML configuration stream (e.g., using the data model) to generate an interfaces resource XML configuration sub-stream (e.g., for processing by an interfaces processing module of the NMS). As shown in FIG. 2G, the NMS may process the XML configuration stream (e.g., using the data model) to generate a security-zone resource XML configuration sub-stream (e.g., for processing by a security-zone processing module of the NMS).

As indicated above, FIGS. 2A-2G are provided as an example. Other examples may differ from what is described with regard to FIGS. 2A-2G.

FIG. 3 is a diagram of an example environment 300 in which systems and/or methods described herein may be implemented. As shown in FIG. 3, environment 300 may include an NMS 301, which may include one or more elements of and/or may execute within a cloud computing system 302. The cloud computing system 302 may include one or more elements 303-312, as described in more detail below. As further shown in FIG. 3, environment 300 may include a network 320, and/or a network device 330. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the NMS 301 may include one or more elements 303-312 of the cloud computing system 302, may execute within the cloud computing system 302, and/or may be hosted within the cloud computing system 302, in some implementations, the NMS 301 may not be cloud-based (e.g., may be implemented outside of a cloud computing system) or may be partially cloud-based. For example, the NMS 301 may include one or more devices that are not part of the cloud computing system 302, such as device 400 of FIG. 4 or device 500 of FIG. 5, which may include a standalone server or another type of computing device. The NMS 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The network device 330 includes one or more devices capable of receiving, processing, storing, routing, and/or providing traffic (e.g., a packet or other information or metadata) in a manner described herein. For example, the network device 330 may include a router, such as a label switching router (LSR), a label edge router (LER), an ingress router, an egress router, a provider router (e.g., a provider edge router or a provider core router), a virtual router, or another type of router. Additionally, or alternatively, the network device 330 may include a gateway, a switch, a firewall, a hub, a bridge, a reverse proxy, a server (e.g., a proxy server, a cloud server, or a data center server), a load balancer, and/or a similar device. In some implementations, the network device 330 may be a physical device implemented within a housing, such as a chassis. In some implementations, the network device 330 may be a virtual device implemented by one or more computer devices of a cloud computing environment or a data center. In some implementations, a group of network devices 330 may be a group of data center nodes that are used to route traffic flow through network 320.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
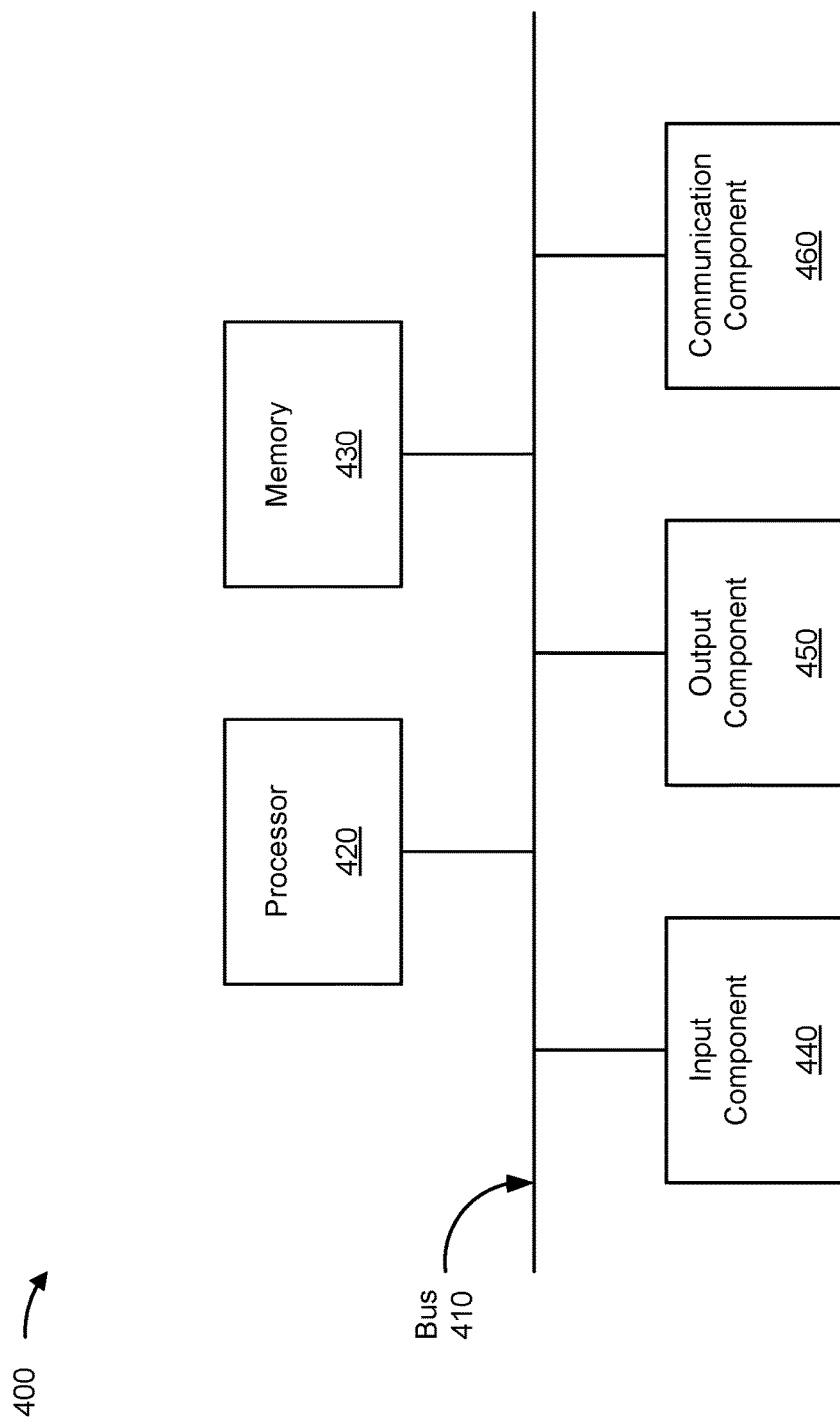
FIGS. 4-5 are diagrams of example components of a device described herein.

FIG. 4 is a diagram of example components of a device 400 associated with generating XML configuration substreams based on an XML configuration stream and a metadata tree associated with the XML configuration stream. The device 400 may correspond to the computing hardware 303, and/or the network device 330. In some implementations, the computing hardware 303, and/or the network device 330 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
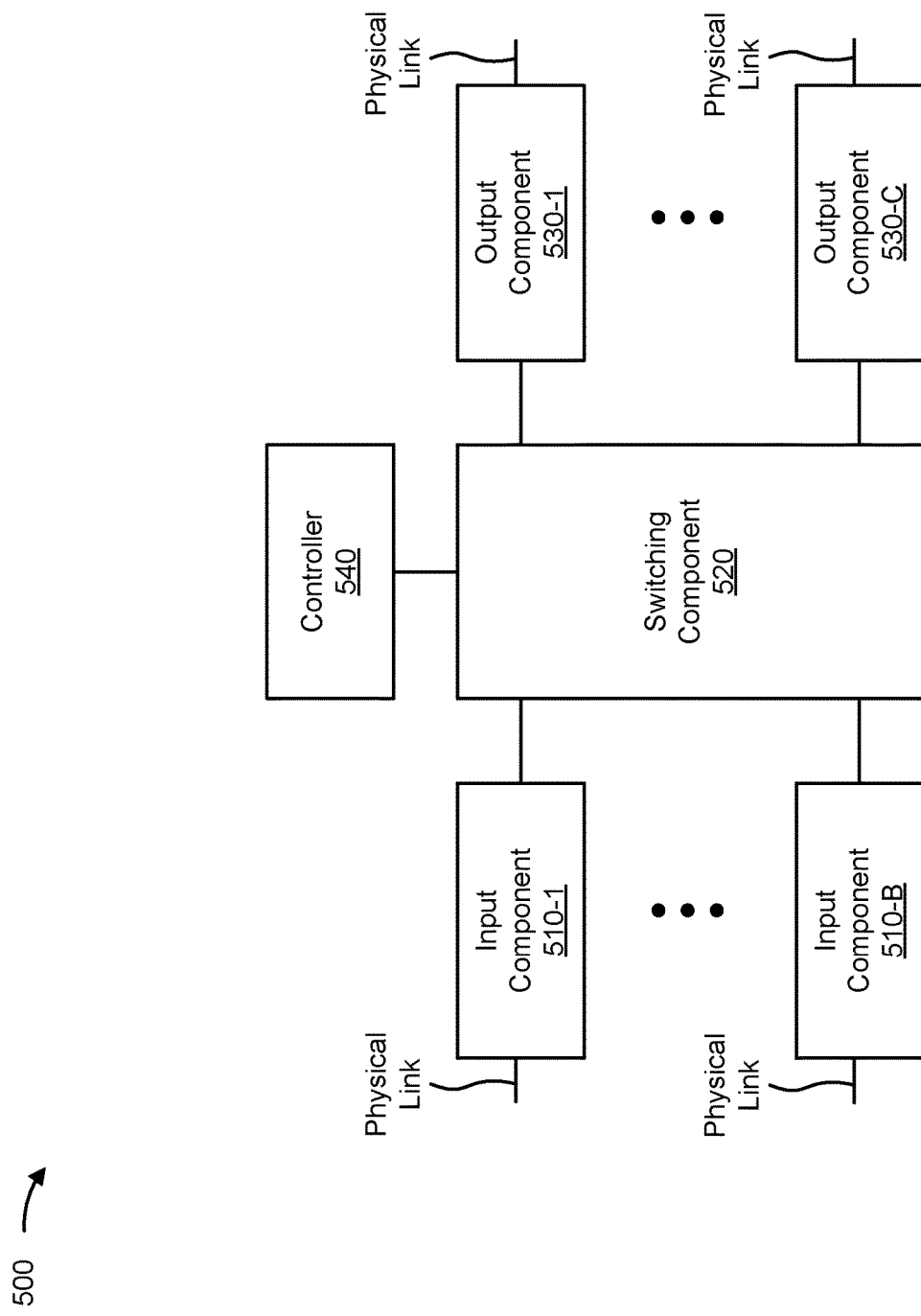

FIG. 5 is a diagram of example components of a device 500 associated with generating XML configuration substreams based on an XML configuration stream and a metadata tree associated with the XML configuration stream. Device 500 may correspond to the NMS 301, the computing hardware 303, and/or the network device 330. In some implementations, the computing hardware 303, and/or the network device 330 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
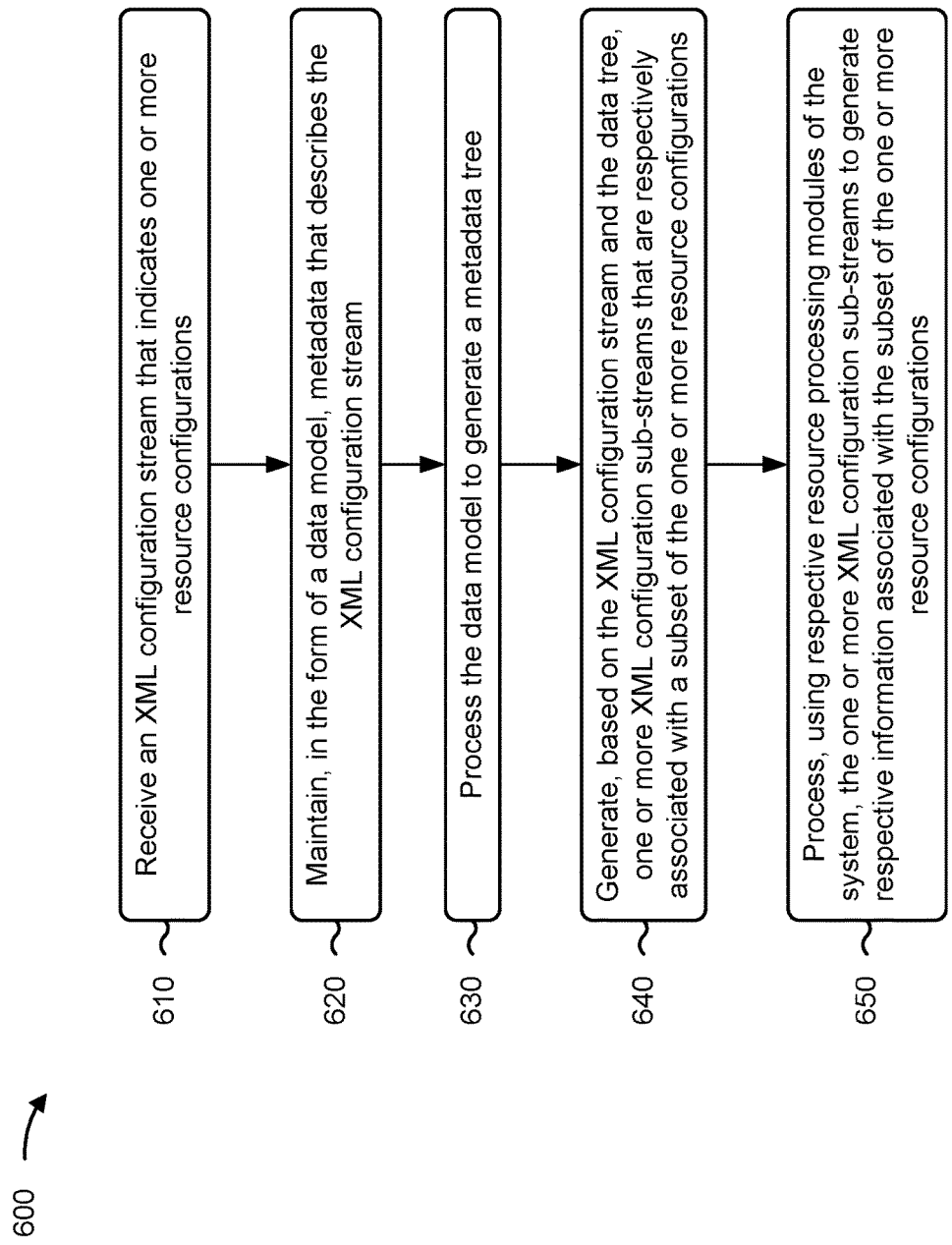
FIG. 6 is a flowchart of an example process associated with generating XML configuration sub-streams based on an XML configuration stream and a metadata tree associated with the XML configuration stream.

FIG. 6 is a flowchart of an example process 600 associated with generating XML configuration sub-streams based on an XML configuration stream and a metadata tree associated with the XML configuration stream. In some implementations, one or more process blocks of FIG. 6 are performed by a system (e.g., the NMS 301). In some implementations, one or more process blocks of FIG. 6 are performed by another device or a group of devices separate from or including the system, such as a network device (e.g., the network device 330). Additionally, or alternatively, one or more process blocks of FIG. 6 may be performed by one or more components of device 400, such as processor 420, memory 430, input component 440, output component 450, and/or communication component 460; one or more components of device 500, such as input component 510, switching component 520, output component 530, and/or controller 540; and/or one or more components of another device.

As shown in FIG. 6, process 600 may include receiving an XML configuration stream that indicates one or more resource configurations (block 610). For example, the system may receive an XML configuration stream that indicates one or more resource configurations, as described above.

As further shown in FIG. 6, process 600 may include maintaining, in the form of a data model, metadata that describes the XML configuration (block 620). For example, the system may process the XML configuration may maintain, in the form of a data model, metadata that describes the XML configuration, as described above.

As further shown in FIG. 6, process 600 may include processing the data model to generate a metadata tree (block 630). For example, the system may process the data model to generate a metadata tree, as described above.

As further shown in FIG. 6, process 600 may include generating, based on the XML configuration stream and the metadata tree, one or more XML configuration sub-streams that are respectively associated with a subset of the one or more resource configurations (block 640). For example, the system may generate, based on the XML configuration stream and the metadata tree, one or more XML configuration sub-streams that are respectively associated with a subset of the one or more resource configurations, as described above.

As further shown in FIG. 6, process 600 may include processing, using respective resource processing modules of the system, the one or more XML configuration sub-streams to generate respective information associated with the subset of the one or more resource configurations (block 650). For example, the system may process, using respective resource processing modules of the system, the one or more XML configuration sub-streams to generate respective information associated with the subset of the one or more resource configurations, as described above.

Process 600 may include additional implementations, such as any single implementation or any combination of implementations described below and/or in connection with one or more other processes described elsewhere herein.

In a first implementation, the information that is associated with a resource configuration, of the subset of the one or more resource configurations, includes at least one of updating information that indicates one or more out-of-band changes to the resource configuration, or a translated version of an XML configuration sub-stream, of the one or more XML configuration sub-streams, that is associated with the resource configuration.

In a second implementation, alone or in combination with the first implementation, process 600 includes providing the information that is associated with a resource configuration, of the subset of the one or more resource configurations, to a device to allow the device to update the device according to the information.

In a third implementation, alone or in combination with one or more of the first and second implementations, the data model includes a data element that corresponds to a resource configuration, of the one or more resource configurations, indicated by the XML configuration stream, wherein the data element comprises at least one of: a first parameter indicating that the data element is of interest for further processing by the system, or a second parameter indicating an identifier that is associated with the data element.

In a fourth implementation, alone or in combination with one or more of the first through third implementations, the metadata tree comprises a node that corresponds to a data element of the data model and to a resource configuration, of the one or more resource configurations, of the XML configuration stream.

In a fifth implementation, alone or in combination with one or more of the first through fourth implementations, generating the one or more XML configuration sub-streams comprises identifying a start element of the XML configuration stream; identifying a node of the metadata tree that is associated with the start element; causing, based on identifying the node, a stream writer to be created; generating, based on causing the stream writer to be created and based on processing the XML configuration stream and the metadata tree, an XML snippet; and providing the XML snippet to the stream writer to allow the stream writer to generate a particular XML configuration sub-stream of the one or more XML configuration sub-streams.

In a sixth implementation, alone or in combination with one or more of the first through fifth implementations, generating the XML snippet comprises identifying another start element of the XML configuration stream that is a child element of the start element, wherein the other start element is a parent element in a set of elements of the XML configuration stream; identifying another node of the metadata tree that is associated with the other start element; determining, based on the other node, that the set of elements are to be included in the XML snippet; and generating the XML snippet to include the set of elements and respective attributes of the set of elements.

In a seventh implementation, alone or in combination with one or more of the first through sixth implementations, generating the XML snippet comprises identifying another start element of the XML configuration stream that is a child element of the start element; identifying another node of the metadata tree that is associated with the other start element; determining, based on the other node, that the other start element is to be stored in a data structure that stores start elements; causing the other start element to be stored in the data structure; determining, after causing the other start element to be stored in the data structure, that one or more start elements of the data structure are to be included in the XML snippet; and generating the XML snippet to include the one or more start elements.

In an eighth implementation, alone or in combination with one or more of the first through seventh implementations, generating the XML snippet comprises identifying another start element of the XML configuration stream that is a child element of the start element, wherein the other start element is a parent element of a set of elements of the XML configuration stream; identifying another node of the metadata tree that is associated with the other start element; determining, based on the other node, that the set of elements are to be included in the XML snippet; and generating the XML snippet to include the set of elements.

In a ninth implementation, alone or in combination with one or more of the first through eighth implementations, generating the XML snippet comprises identifying an end element of the XML configuration stream that is associated with the start element; identifying, based on identifying the end element, that a data structure is storing one or more start elements that are child elements of the start element; generating one or more end elements that are respectively associated with the one or more start elements; and generating the XML snippet to include the one or more end elements.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a system, an extensible markup language (XML) configuration stream that indicates one or more resource configurations;
   maintaining, by the system, in form of a data model, metadata that describes the XML configuration stream;
   processing, by the system, the data model to generate a metadata tree,
      wherein the metadata tree comprises a particular node that corresponds to a particular resource configuration, of the one or more resource configurations, of the XML configuration stream;
   generating, by the system and based on the XML configuration stream and the metadata tree, one or more XML configuration sub-streams that are respectively associated with a subset of the one or more resource configurations,
      wherein generating the one or more XML configuration sub-streams comprises:
         generating, based on causing a stream writer to be created and based on processing the XML configuration stream and the metadata tree, an XML snippet; and
         providing the XML snippet to a stream writer to allow the stream writer to generate a particular XML configuration sub-stream of the one or more XML configuration sub-streams; and
   processing, by the system and using respective resource processing modules of the system, the one or more XML configuration sub-streams to generate respective information associated with the subset of the one or more resource configurations.

2. The method of claim 1, wherein the information that is associated with a resource configuration, of the subset of the one or more resource configurations, includes at least one of:
   update information that indicates one or more out-of-band changes to the resource configuration; or
   a translated version of an XML configuration sub-stream, of the one or more XML configuration sub-streams, that is associated with the resource configuration.

3. The method of claim 1, further comprising providing the information that is associated with a resource configuration, of the subset of the one or more resource configurations, to a device to allow the device to update the device according to the information.

4. The method of claim 1, wherein the data model includes a data element that corresponds to a resource configuration, of the one or more resource configurations, indicated by the XML configuration stream, wherein the data element comprises at least one of:
   a first parameter indicating that the data element is of interest for further processing by the system, or
   a second parameter indicating an identifier that is associated with the data element.

5. The method of claim 1, wherein the node corresponds to a data element of the data model.

6. The method of claim 1, wherein generating the one or more XML configuration sub-streams comprises:
   identifying a start element of the XML configuration stream;
   identifying the particular node of the metadata tree that is associated with the start element; and
   causing, based on identifying the node, the stream writer to be created.

7. The method of claim 6, wherein generating the XML snippet comprises:
   identifying another start element of the XML configuration stream that is a child element of the start element, wherein the other start element is a parent element in a set of elements of the XML configuration stream;
   identifying another node of the metadata tree that is associated with the other start element;
   determining, based on the other node, that the set of elements are to be included in the XML snippet; and
   generating the XML snippet to include the set of elements and respective attributes of the set of elements.

8. The method of claim 6, wherein generating the XML snippet comprises:
   identifying another start element of the XML configuration stream that is a child element of the start element;
   identifying another node of the metadata tree that is associated with the other start element;
   determining, based on the other node, that the other start element is to be stored in a data structure that stores start elements;
   causing the other start element to be stored in the data structure;
   determining, after causing the other start element to be stored in the data structure, that one or more start elements of the data structure are to be included in the XML snippet; and
   generating the XML snippet to include the one or more start elements.

9. The method of claim 6, wherein generating the XML snippet comprises:
   identifying another start element of the XML configuration stream that is a child element of the start element, wherein the other start element is a parent element of a set of elements of the XML configuration stream;
   identifying another node of the metadata tree that is associated with the other start element;
   determining, based on the other node, that the set of elements are to be included in the XML snippet; and
   generating the XML snippet to include the set of elements.

10. The method of claim 6, wherein generating the XML snippet comprises:
   identifying an end element of the XML configuration stream that is associated with the start element;
   identifying, based on identifying the end element, that a data structure is storing one or more start elements that are child elements of the start element;
   generating one or more end elements that are respectively associated with the one or more start elements; and
   generating the XML snippet to include the one or more end elements.

11. A non-transitory computer-readable medium storing a set of instructions, the set of instructions comprising:
   one or more instructions that, when executed by one or more processors of a system, cause the system to:
      receive an extensible markup language (XML) configuration stream;
      maintain a data model associated with the XML configuration stream;
      process the data model to generate a metadata tree,
         wherein the metadata tree comprises a particular node that corresponds to a particular resource configuration of the XML configuration stream; and
      generate, based on the XML configuration stream and the metadata tree, one or more XML configuration sub-streams,
         wherein the one or more instructions that cause the system to generate the one or more XML configuration sub-streams, cause the system to:
            generate, based on causing a stream writer to be created and based on processing the XML configuration stream and the metadata tree, an XML snippet; and
            provide the XML snippet to a stream writer to allow the stream writer to generate a particular XML configuration sub-stream of the one or more XML configuration sub-streams.

12. The non-transitory computer-readable medium of claim 11, wherein the data model includes a data element that corresponds to a resource configuration indicated by the XML configuration stream, wherein the data element comprises at least one of:
   a first parameter indicating that the data element is of interest for further processing by the system, or
   a second parameter indicating an identifier that is associated with the data element.

13. The non-transitory computer-readable medium of claim 12, wherein the metadata tree includes only nodes that correspond to data elements, of the data model, that include the first parameter.

14. The non-transitory computer-readable medium of claim 11, wherein the one or more instructions, that cause the system to generate the one or more XML configuration sub-streams, cause the system to:
   identify a start element of the XML configuration stream;
   identify a node of the metadata tree that is associated with the start element; and
   cause, based on identifying the node, a stream writer to be created.

15. A system, comprising:
   one or more memories; and
   one or more processors to:
      process an extensible markup language (XML) configuration stream that indicates one or more resource configurations to generate a metadata tree,
         wherein the metadata tree comprises a particular node that corresponds to a particular resource configuration, of the one or more resource configurations, of the XML configuration stream;
      dynamically generate, based on the XML configuration stream and the metadata tree, one or more XML configuration sub-streams that are respectively associated with a subset of the one or more resource configurations,
         wherein the one or more processors, to generate the one or more XML configuration sub-streams, are to:

generate, based on causing a stream writer to be created and based on processing the XML configuration stream and the metadata tree, an XML snippet, and provide the XML snippet to a stream writer to allow the stream writer to generate a particular XML configuration sub-stream of the one or more XML configuration sub-streams; and process, using respective resource processing modules of the system, the one or more XML configuration sub-streams to generate respective information associated with the subset of the one or more resource configurations.

16. The system of claim 15, wherein the system, using the respective resource processing modules of the system, processes the one or more XML configuration sub-streams in parallel to generate the respective information associated with the subset of the one or more resource configurations.

17. The system of claim 15, wherein the system, using the respective resource processing modules of the system, processes the one or more XML configuration sub-streams allows for at least one of:

the processing of the XML configuration across multiple processing modules, or the resource processing modules of the system and a general processing module of the system to not exceed respective resource allocations.

18. The system of claim 15, wherein the one or more processors are further to provide the information that is associated with a resource configuration, of the subset of the one or more resource configurations, to a device to allow the device to update the device according to the information.

19. The system of claim 15, wherein the one or more processors, to process the XML configuration stream to generate the metadata tree, are to:

maintain a data model associated with the XML configuration stream; and process the data model to generate the metadata tree.

20. The system of claim 19, wherein the data model is represented as a Kubernetes custom resource definition (CRD).

* * * * *